United States Patent [19]

Hass et al.

[11] 3,784,223
[45] Jan. 8, 1974

[54] SAFETY APPARATUS
[75] Inventors: David P. Hass, Detroit; John E. Kunz, Westland, both of Mich.
[73] Assignee: Eaton Corporation, Cleveland, Ohio
[22] Filed: June 10, 1971
[21] Appl. No.: 151,665

[52] U.S. Cl. .............. 280/150 AB, 180/90, 222/3, 137/68, 280/150 B
[51] Int. Cl. ......................................... B60r 21/08
[58] Field of Search ................. 280/150 B, 150 AB; 180/90

[56] References Cited
UNITED STATES PATENTS

| | | | |
|---|---|---|---|
| 3,610,657 | 10/1971 | Cole | 280/150 AB |
| 3,633,936 | 1/1972 | Huber | 280/150 B |
| 3,549,169 | 12/1970 | Oldberg | 280/150 AB |
| 2,834,606 | 5/1958 | Bertrand | 280/150 AB |
| 3,376,947 | 4/1968 | Barenyi et al. | 180/90 |
| 3,439,769 | 4/1968 | Brilmyer | 280/150 B X |
| 3,477,740 | 11/1969 | Hass | 280/150 AB |
| 3,481,625 | 12/1969 | Chute | 280/150 AB |
| 3,516,685 | 6/1970 | Goetz | 280/150 AB |
| 3,552,769 | 1/1971 | Kemmerer et al. | 280/150 AB |
| 3,602,527 | 8/1971 | Goetz et al. | 280/150 AB |
| 3,614,127 | 10/1971 | Glance | 280/150 AB |
| 3,618,978 | 11/1971 | Klove et al. | 280/150 AB |
| 3,632,135 | 1/1972 | Chute et al. | 280/150 AB |
| 3,642,303 | 2/1972 | Irish et al. | 280/150 AB |
| 3,582,107 | 6/1971 | Goetz et al. | 280/150 AB |

Primary Examiner—Kenneth H. Betts
Assistant Examiner—John P. Silverstrim
Attorney—Teagno & Toddy

[57] ABSTRACT

A safety apparatus for a vehicle includes a plurality of expandable confinements for protecting an occupant of the vehicle during an accident, an elongate diffuser member, an elongate fluid reservoir disposed concentrically with the longitudinal axis of the elongate diffuser member, and a valve for effecting fluid flow from the reservoir. The valve is mounted at one end of the reservoir and engages with one end portion of the diffuser member so as to positively locate the diffuser member relative to the reservoir. Mounting means are provided for supporting the ends of the diffuser member adjacent the side walls of the vehicle, and providing for relative movement of the diffuser member and the vehicle in the event an occupant impacts with the diffuser member so as to absorb and dissipate the kinetic energy of the occupant. The diffuser member includes a first group of openings for directing fluid to a first one of the plurality of confinements and a second group of openings for directing fluid to a second one of the plurality of confinements. The first and second groups of openings each have an effective area and a location on the elongate diffuser member to control the fluid flow from the reservoir so as to effect expansion of their associated confinements in a predetermined manner.

19 Claims, 11 Drawing Figures

INVENTORS
JOHN E. KUNZ
DAVID P. HASS
BY Teagno and Toddy
ATTORNEYS

INVENTORS
JOHN E. KUNZ
DAVID P. HASS
BY Teagno and Toddy
ATTORNEYS

INVENTORS
JOHN E. KUNZ
DAVID P. HASS

BY Teagno and Toddy
ATTORNEYS

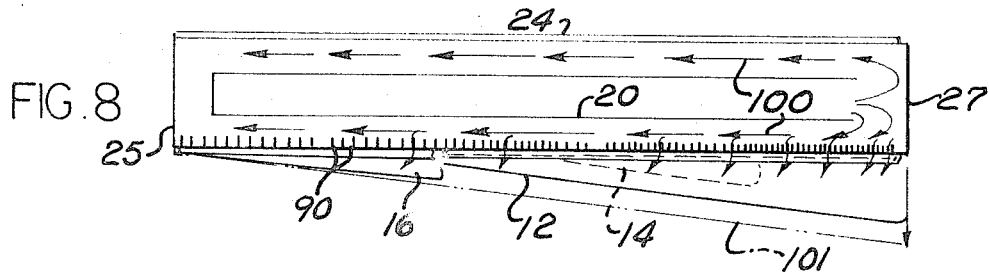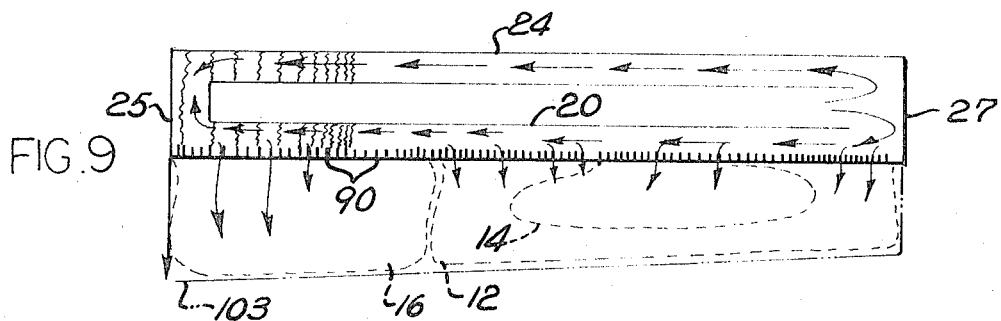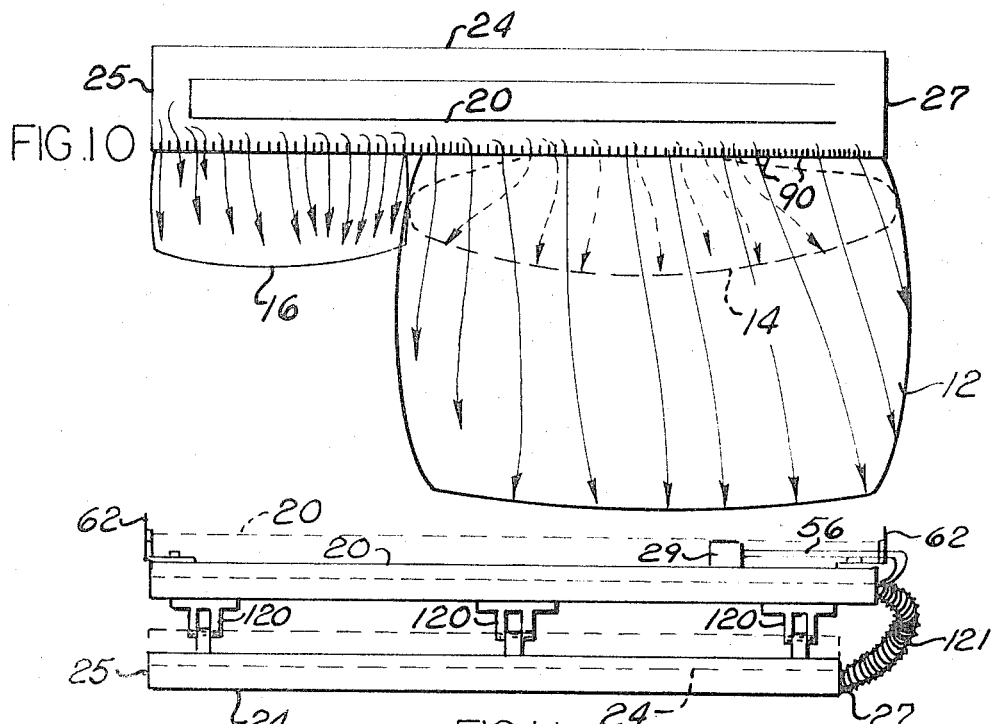

SAFETY APPARATUS

The present invention relates to a safety apparatus for use on a vehicle and more specifically to a safety apparatus including a plurality of confinements having a collapsed condition and an expanded operative condition and means for effecting expansion of the confinements in a controlled manner.

Known safety apparatus are mounted rigidly on the vehicle and during low impact accidents in which it is not desired to inflate the confinement, the safety apparatus provide an obstruction in the vehicle against which an occupant may impact when the confinement is not expanded, thereby causing injury to the occupant.

Accordingly, an object of the present invention is to provide a new and improved safety apparatus for use on a vehicle for effecting expansion of a plurality of confinements and wherein the safety apparatus is operable when the confinements are in their collapsed condition to absorb and dissipate the kinetic energy of the occupant in the event the occupant impacts therewith while the confinements are in a collapsed condition to thereby prevent injury to the occupant of the vehicle.

Another object of the present invention is to provide a new and improved safety apparatus for use on the vehicle including a confinement having a collapsed inoperative condition and an expanded operative condition, a source of fluid for effecting expansion of the confinement and a diffuser member having a plurality of openings therein whose location on the diffuser member and cross sectional area are such that controlled expansion of the confinement may be effected in a predetermined manner.

Still another object of the present invention is to provide a new and improved safety apparatus for use on a vehicle including a confinement having a collapsed condition and an expanded operative condition, a source of fluid, and a diffuser member having a plurality of openings therein for directing the fluid from the source of fluid to the interior of the confinement to effect expansion thereof, the diffuser member communicates at one end with the source of fluid and is sealed at the opposite end thereof so that fluid flows from the source of fluid through the diffuser member to develop a stagnation pressure adjacent the sealed end of the diffuser member, the stagnation pressure moves back toward the one end of the diffuser member with the openings in the diffuser member being located and having a cross sectional area so that expansion of the confinement can be controlled in a predetermined manner.

A further object of the present invention is to provide a new and improved safety apparatus for use on a vehicle including a plurality of expandable confinements having collapsed conditions and expanded operative conditions, a source of fluid for effecting expansion of the confinements, a diffuser member having a plurality of openings therein for directing fluid from the source of fluid to the plurality of confinements, the plurality of openings in the diffuser member including a first group of openings for directing fluid to one of the confinements and a second group of openings for directing fluid to another of the plurality of confinements with the groups of openings having a configuration and combined effective area for effecting expansion of the one confinement in a predetermined manner and the other confinement in a predetermined manner differing from the predetermined manner in which the first confinement is expanded.

A still further object of the present invention is to provide a new and improved safety apparatus for use on a vehicle including a first confinement mounted on the steering assembly of the vehicle and a second confinement mounted adjacent the dashboard of the vehicle, the first and second confinements having collapsed conditions and expanded operative conditions, a source of fluid for effecting expansion of the first and second confinements, a diffuser member providing fluid communication between the source of fluid and the confinements, conduit means communicating at one end with the diffuser member and at the opposite end thereof with the first confinement disposed on the steering assembly for directing fluid from the diffuser assembly to effect expansion of the first confinement mounted on the steering assembly and sensor means for sensing the occurrence of an accident and actuating the source of fluid to effect fluid flow from the source of fluid to the diffuser member.

Still another object of the present invention is to provide a new and improved safety apparatus for use on a vehicle including first and second expandable confinements for engaging with the legs of a passenger of the vehicle and the driver of the vehicle respectively, third and fourth expandable confinements for engaging with the torso of a passenger of the vehicle and the torso of the driver of the vehicle respectively, a fluid reservoir having high pressure fluid therein for effecting expansion of the confinements, a diffuser member disposed coaxially with the fluid reservoir and providing fluid communication between the fluid reservoir and the confinements, mounting means for mounting the diffuser member with the ends thereof adjacent to the side walls of the vehicle and providing for relative movement between the diffuser member and the side walls of the vehicle upon impact of an occupant of the vehicle with the diffuser member to thereby absorb and dissipate kinetic energy of the occupant, conduit means having one end thereof communicating with the diffuser member and the opposite end thereof communicating with the fourth confinement member which is mounted on the steering assembly of the vehicle to provide fluid flow from the diffuser member to the fourth confinement to effect expansion thereof and an explosive valve mounted on one end of the elongate fluid reservoir and engaging with one end of the diffuser member to provide for positive positioning of the fluid reservoir relative to the diffuser member, the explosive valve forming an opening in the reservoir to enable fluid to flow therefrom through the diffuser member to effect expansion of the confinements upon the occurrence of an accident.

A further object of the present invention is to provide a new and improved method of actuating a safety apparatus having an expandable confinement, a source of fluid and an elongate diffuser member having a plurality of openings therein communicating with the confinement, a first closed end portion and a second end portion, the method comprising the steps of directing fluid flow from the source of fluid to the diffuser member at the second end portion thereof, directing the fluid from the second end portion toward the first end portion of the diffuser member, developing a stagnation pressure buildup adjacent the first end portion of the diffuser member, moving the stagnation pressure buildup toward the second end portion of the diffuser member and directing fluid flow through the openings in the diffuser member to the interior of the confinement with the flow rate of fluid through the openings increasing per unit area of the openings as the distance the opening is located from the first end portion decreases.

Further objects and advantages of the present invention will become apparent from the following detailed description taken in conjunction with the following drawings wherein:

FIG. 8 is a schematic illustration illustrating the reservoir, diffuser and confinements after initial actuation of the explosive valve;

FIG. 9 is a schematic view similar to FIG. 8 showing the fluid flow after the fluid has impinged upon the end wall of the diffuser member;

Figure 1:
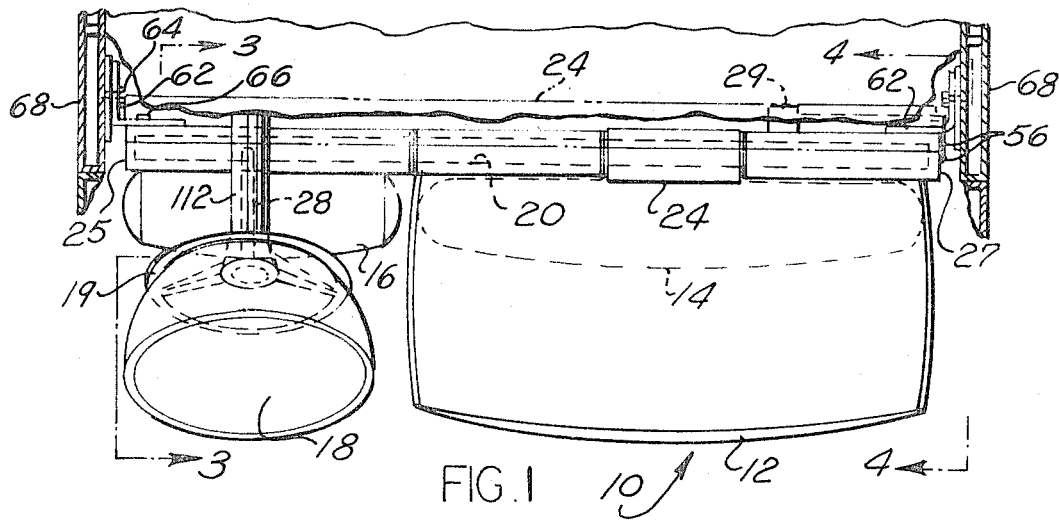
FIG. 1 is a schematic view of a preferred embodiment of the invention showing the driver and passenger knee bags and the driver and passenger torso bags in an expanded condition.

FIG. 10 is a schematic illustration similar to FIG. 9 illustrating the bags moving to their expanded condition after the fluid has impinged on the end wall of the diffuser and is moving through the openings in the diffuser assembly; and FIG. 11 is a schematic illustration of a further embodiment of the present invention in which the reservoir and diffuser members are disposed parallel to each other and the diffuser is movable relative to the reservoir.

The present invention relates to a safety apparatus for use on a vehicle which includes a plurality of expandable confinements having collapsed conditions and expanded operative conditions for protecting occupants of the vehicle during an accident. An elongate fluid reservoir provides a source of fluid for effecting expansion of the confinements. An elongate diffuser member is disposed concentric to the fluid reservoir and directs the flow of fluid from the reservoir to the confinements in a predetermined manner. Mounting means are provided for supporting the diffuser member with the ends thereof adjacent to the side walls of the vehicle. The mounting means provide for relative movement between the diffuser member and the side walls of the vehicle upon impact of an occupant with the diffuser member to thereby absorb and dissipate kinetic energy of the occupant so as to prevent injury to the occupant of the vehicle. One of the confinements is located on the steering assembly of the vehicle and a conduit is provided having one end communicating with the diffuser member and the opposite end communicating with the confinement mounted on the steering assembly. The conduit provides for fluid communication between the diffuser member and the steering assembly mounted confinement so as to effect expansion of the confinement upon opening of the fluid reservoir. The fluid reservoir is operable to be opened by an explosive valve at one end thereof adjacent to one end of the diffuser member. Fluid flows from the fluid reservoir upon actuation of the explosive valve in a direction away from the one end of the diffuser assembly toward the opposite end thereof. The fluid flow is at a generally high velocity and the fluid flow impinges upon the opposite end portion thereof. The fluid flow then develops a pressure buildup or stagnation pressure adjacent the opposite end portion of the diffuser member. The stagnation pressure moves toward the one end portion of the diffuser member as the fluid continues to flow from the diffuser member so that the fluid flows through the openings disposed in the diffuser member to thereby effect expansion of the confinement. The openings which are disposed in the diffuser member are divided into groups of openings with each of the groups communicating with a single one of the confinements. The number of openings in the groups, the effective area of the groups, and the location of openings is such that a controlled expansion of the plurality of confinements can be effected in a predetermined manner.

A safety apparatus 10 includes a plurality of expandable confinements 12, 14, 16, and 18. The confinements each have an expanded operative condition, as illustrated in FIG. 1, and a collapsed condition, illustrated in FIGS. 3 and 4 in full line position. The confinement 12 is a torso bag for engaging with the torso of an occupant of the vehicle and the confinement 14 is a knee bag for engaging with the legs of an occupant of the vehicle. The confinement 14 is disposed within the confinement 12. The confinement 16 is a knee bag for engaging with the legs of a driver of the vehicle and the confinement 18 is a torso bag mounted on the steering wheel 19 for engaging with the torso of the driver of the vehicle. Upon the occurrence of an accident the confinements 12, 14, 16 and 18 will be simultaneously expanded to absorb and dissipate the kinetic energy of the occupants to thereby prevent injury to the occupants.

Figure 2:
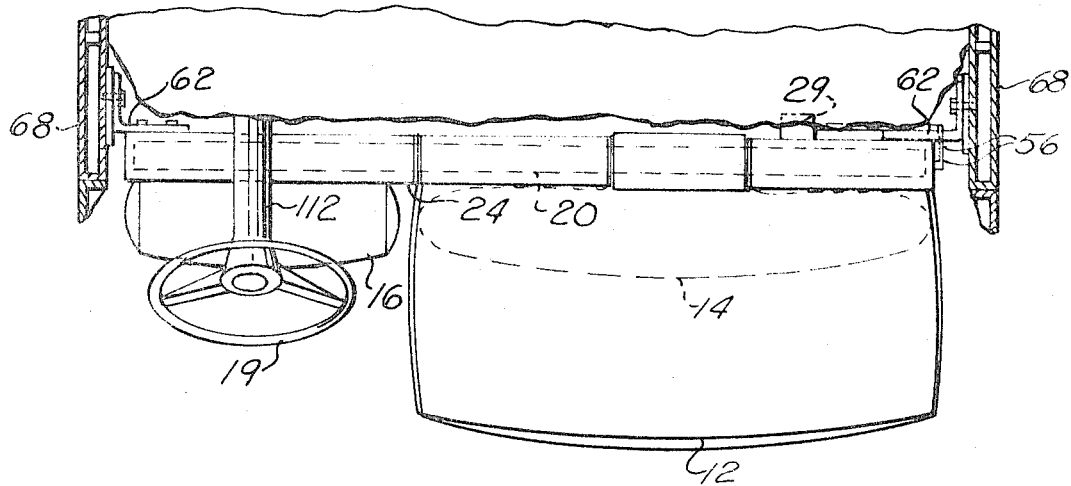
FIG. 2 is a schematic view of a second embodiment of the invention showing the driver and passenger knee bags in an expanded condition and the passenger torso bag in an expanded condition and utilizing a separate driver steering wheel bag.

Another embodiment of the invention illustrated in FIG. 2, shows a system similar to the system illustrated in FIG. 1, with the exception that a separate safety apparatus, not illustrated, is contemplated for use on the steering wheel 19. In this embodiment a separate safety apparatus if desired, can be mounted in the hub of the steering assembly 19 to provide a torso bag for protecting the driver of the vehicle.

The knee bags 14 and 16 engage with the knees of the passengers and driver, respectively, of the vehicle and the torso bags 12 and 18 engage with the torsos of the passengers and driver of the vehicle respectively. While the confinements 12, 14, 16 and 18 will be simultaneously expanded from their collapsed condition, shown in FIG. 4, to their expanded operative condition, shown in FIG. 1, it is desired to effect expansion of the knee bags 14 and 16 to their fully expanded condition before the torso bags 12 and 18 reach their fully expanded condition. This enables the knee bags 14 and 16 to engage with the legs and knees of the occupants to push the occupants of the vehicle so that the occupants are positioned in a predetermined area prior to engagement of the occupants with the torso bags 12 and 18. The knee bags 14 and 16, by leading expansion of the torso bags 12 and 18, assure that the torso bags have a predetermined area into which they may expand. Thus, after the occupants are positioned by engagement of the occupants with the knee bags 14 and 16 and the knee bags dissipate and absorb a portion of the occupants' kinetic energy, the torso bags 12 and 18 will engage with the occupants to further absorb and dissipate the kinetic energy of the occupants.

Figure 3:
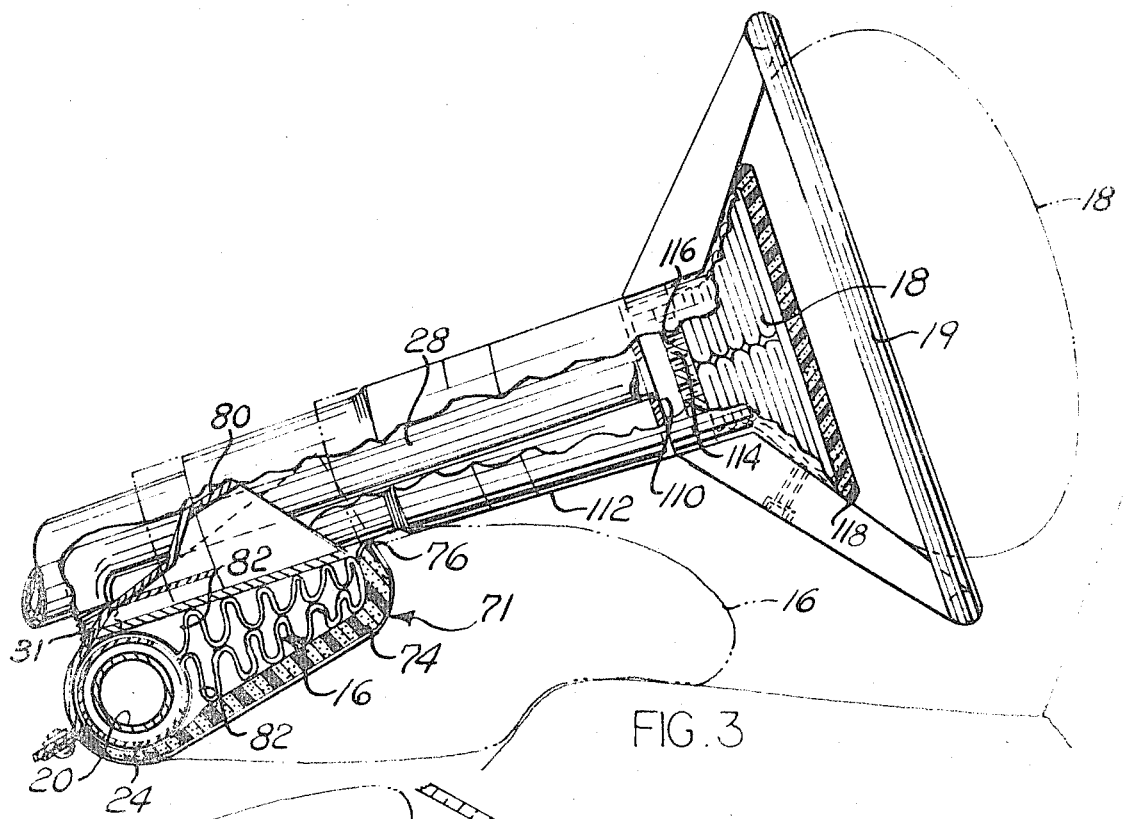
FIG. 3 is a sectional view taken approximately along the lines 3—3 of FIG. 1 more fully illustrating the construction and mounting of the present invention on the steering assembly.
Figure 4:
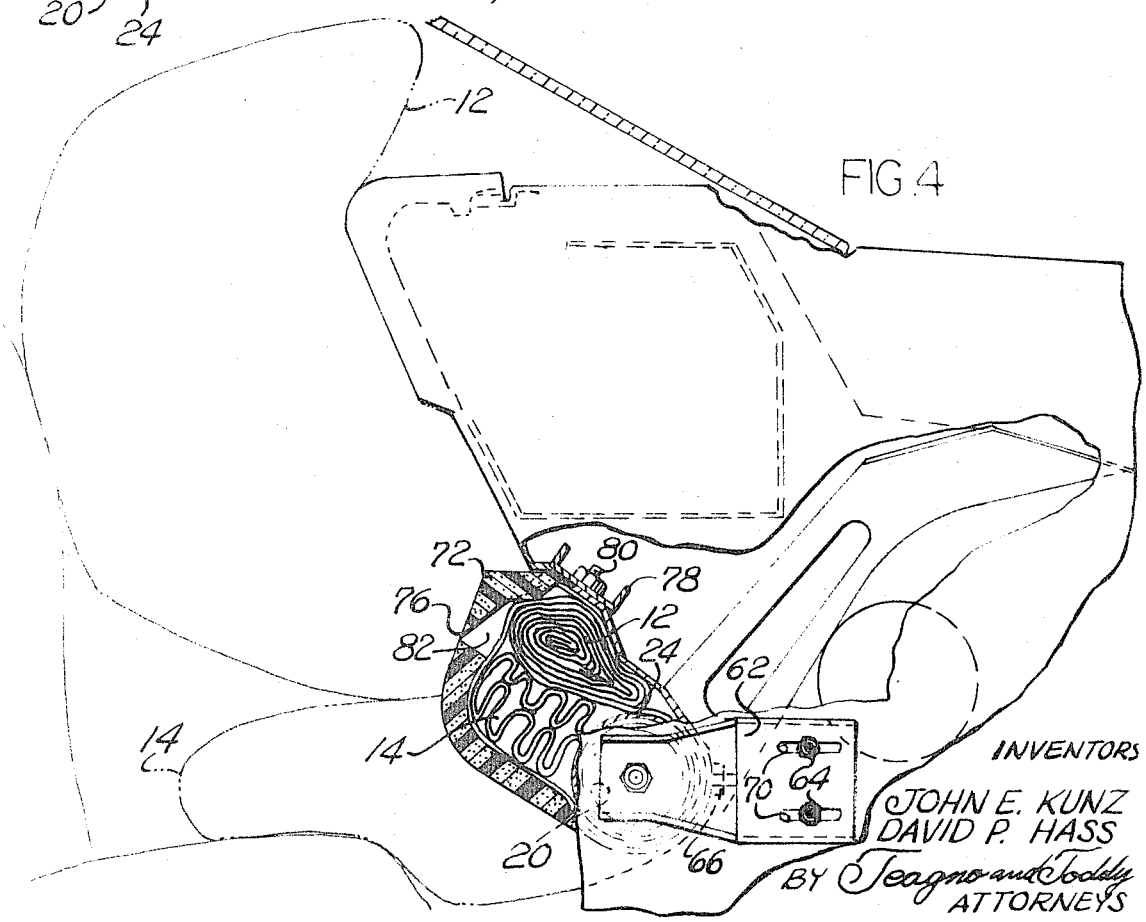
FIG. 4 is a sectional view taken approximately along the lines 4—4 of FIG. 1 more fully illustrating the mounting assembly on the side wall of the vehicle.

The confinement 12 when in its collapsed condition has a rolled configuration, as illustrated in FIGS. 3 and 4 and the confinements 14, 16, and 18 have a folded configuration when in their collapsed condition. Actuation of the safety apparatus 10 unfolds the confinements 14, 16 and 18 and unrolls the confinement 12 outwardly toward the occupants of the vehicle and then effects expansion of the confinements. The confinements 14, and 16 will unfold and engage the legs of the occupants prior to expansion thereof to their fully expanded condition. After the confinements are unfolded, the confinements will then be further expanded to their fully expanded condition illustrated in FIG. 1. This procedure enables the confinements to move rapidly and unhindered out of the chamber 82 in which they are stored upon expansion of the confinements. Moreover, the unrolling of confinement 12 from its collapsed condition to its expanded condition tends to direct confinement 12 in a predetermined direction outwardly from the chamber 82 upon expansion of the confinement so as to dispose the confinement in a predetermined position relative to the occupants of the vehicle as the confinement 12 is being expanded.

As illustrated in FIGS. 3 and 4 a source of fluid is provided to effect expansion of the confinements. The source of fluid is preferably a fluid reservoir 20 having nitrogen stored therein. However, it is contemplated that other gases or other fluid sources such as chemicals which are activated to create a fluid, can be utilized. An elongate diffuser member 24 is provided to control the fluid flow from the reservoir 20 to the interior of the confinements. The diffuser is preferably disposed concentrically to the fluid reservoir 20 and directs the flow of fluid from the reservoir 20 to the interior of the confinements. The reservoir 20 has a length which is approximately equal to the combined widths of the confinements 12 and 16 so as to insure proper inflation of the confinements by providing fluid flow in the interior of the confinements adjacent the sides thereof. Associated with the reservoir 20 is a valve 26, preferably an explosive valve, which is operable to be actuated by a suitable sensor 29 which senses the occurrence of an accident to open the fluid reservoir 20 and effect a high velocity fluid flow therefrom to the diffuser member 24. The valve 26 when actuated provides for fluid communication between the reservoir 20 and the diffuser member 24. While the valve 26 is illustrated as providing fluid communication between the reservoir 20 and one end of the diffuser member 24, it should be realized that the valve could be located at other positions to establish fluid flow between the reservoir 20 and diffuser member 24.

Figure 6:
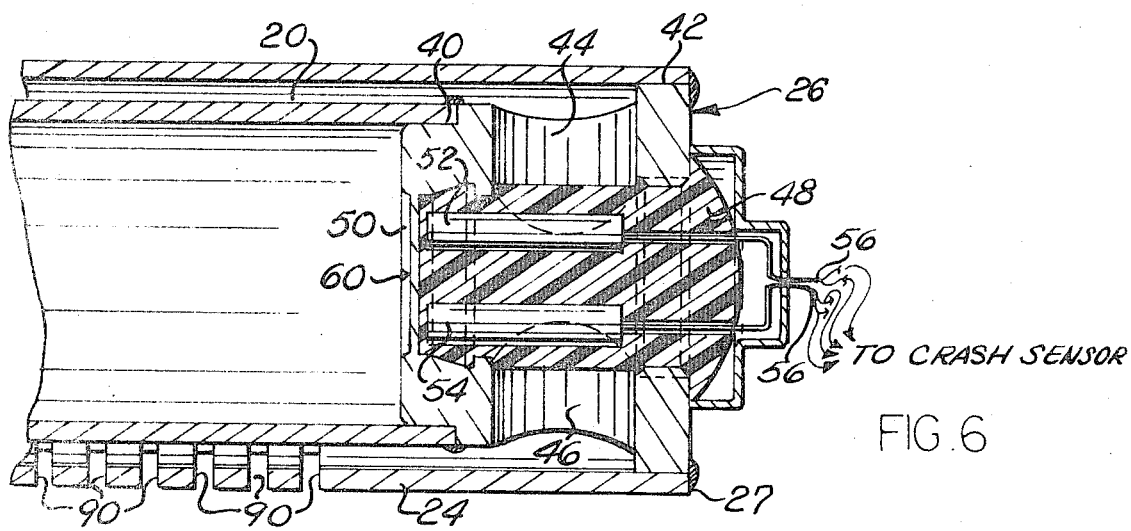
FIG. 6 is a fragmentary view more fully illustrating the cooperation between the explosive valve, the reservoir and the diffuser.

The fluid reservoir 20 is an elongate fluid reservoir which is preferably concentrically located and supported in the diffuser member 24. Supporting the reservoir at the end portion 27 of the diffuser member 24 is the explosive valve 26, more fully illustrated in FIG. 6. The explosive valve 26 includes an annular shoulder portion 40 having its center located on the longitudinal axis of the reservoir 20 and supports and seals the one end of the reservoir 20. The explosive valve 26 further includes an annular shoulder 42 having its center located on the longitudinal axis of the reservoir 20. The annular shoulder 42 engages with and supports the end 27 of the diffuser member 24. The annular shoulders or surfaces 40 and 42 cooperate to support the reservoir 20 and diffuser member 24 in a coaxial relationship relative to each other and provide a fluid-tight seal between the valve 26, the reservoir 20 and the diffuser 24 at the end 27 thereof. The opposite end of the diffuser member 24, is closed by an end plate 25 and the end of the reservoir 20 disposed adjacent to the end plate 25 of the diffuser member 24 is held by suitable mounting means not illustrated. While the reservoir 20 is illustrated as being coaxial to the diffuser member 24 in a preferred embodiment of the invention, it should be apparent that other embodiments of the invention may utilize a reservoir mounted eccentric, parallel or at an angle to the diffuser member.

The explosive valve 26 includes one or more openings or ports. Preferably, the openings take the form of a pair of openings 44 and 46 which are disposed in opposite directions. A friable material 48 is normally disposed in a portion of the openings 44 and 46 and abutts against an end plate 50 which is operable to be ruptured to form a passageway from the fluid reservoir 20 and through the passageways 44 and 46 of the explosive valve 26 to the interior of the diffuser member 24. Supported within the friable material is a pair of explosive charges 52 and 54 having the leads 56 associated therewith. The leads 56 connect the sensor 29 with the explosive charges 52 and 54 and when the sensor senses the occurrence of an accident the sensor will effect actuation of the explosive charges 52 and 54 via the leads 56. Actuation of the explosive charges will effect rupturing of the end plate 50 along pre-weakened portions 60 thereon and will crumble the friable material 48 to enable fluid to flow from the fluid reservoir 20 through the openings 44 and 46 to the interior of the diffuser member 24. The openings 44 and 46 form zero reaction passageways to direct the fluid flow from the reservoir 20.

A conduit 28 having one end in fluid communication with the diffuser member 24 and the opposite end in fluid communication with the expandable confinement 18 is provided to direct fluid flow from the diffuser member 24 to the interior of the confinement 18 disposed on the steering wheel 19 of the vehicle. The conduit 28 enables the confinement 18 to be simultaneously expanded with the confinements 12, 14 and 16 by fluid flow from the reservoir 20. The conduit 28 is connected to the diffuser member 24 by a flexible coupling 31 which provides for relative movement between the diffuser member 24 and the conduit 28. Thus, the flexible coupling 31 will maintain fluid communication between the diffuser member 24, the conduit 28 and the confinement 18 even in the event that relative movement between the conduit 28 and the diffuser occurs.

The diffuser member 24 is supported at both ends by the mounting members 62 which provide for relative movement between the diffuser 24 and the side walls 68 of the vehicle. The mounting members 62 are attached to the rear portion of the diffuser member 24 by suitable fasteners such as bolts 66 and to the side walls 68 of the vehicle by the fasteners 64. The fasteners 64 are rigidly fixed to the side walls 68 of the vehicle and pass through elongate openings 70 in the mounting member 62. The elongate openings 70 enable the mounting members 62 and the diffuser 24 to move relative to the fasteners 64 in a direction parallel to the longitudinal axis of the elongate openings 70. The brackets 62 provide for movement of the diffuser member 24 in a direction parallel to the normal movement of the vehicle, i.e., in a direction perpendicular to the longitudinal axis of the diffuser member 24. Thus, if an occupant should impact with the safety apparatus 10 or a portion thereof such as the diffuser 24, the fasteners 64 will enable the diffuser 24 and the mounting member 62 to slide along the side walls 68 to thereby absorb and dissipate the kinetic energy of the occupant so as to prevent injury of the occupant. Moreover, preferably the diffuser member 24 has a thin wall construction so that the diffuser member may be deformed upon the application of forces thereto to further dissipate and absorb the kinetic energy of the occupant. This particular construction is important due to the fact that it is desired to dissipate and absorb the kinetic energy of the occupant to reduce the chance of injury to the occupant. The mounting members 62 accomplish the desired result by providing for relative movement of the diffuser 24 and the side walls 68 of the vehicle to thereby dissipate and absorb the kinetic energy of the occupant. Moreover, it should be appreciated that the present safety apparatus has energy absorbing and dissipating characteristics which are independent of the energy absorbing and dissipating characteristics of the confinements. The energy absorbing characteristics of the present embodiment have been found to be between 1,200 and 2,800 ft. lbs., prior to expansion of the confinements, which has been found to be effective to prevent injury to the occupants during low impact accidents in which it is not desired to effect expansion of the confinements.

The brackets 62 support diffuser 24 so that it extends across the entire width of the passenger compartment of the vehicle and the ends of the diffuser member are disposed adjacent to the side walls 68. A housing 71, formed by a lower portion of the instrument panel of the vehicle, is provided to locate the diffuser 24 and the other portions of the safety apparatus 10 when the confinements are in their collapsed condition. As is illustrated in FIG. 4 the housing 71 is formed by two portions 72 and 74 which are preferably constructed of an energy absorbing material which acts to protect the safety apparatus 10 and dissipate and absorb kinetic energy of the occupant. The portions 72 and 74 are connected together by a break line 76 by which is a pre-weakened portion of the housing 82. A frame member 78, fastened to the structure of the vehicle, by bolts 80 support the housing structure 71 on the lower portion of the instrument panel of the vehicle. A similar frame member 78 is utilized to support the housing 71 on the lower portion of the steering column 112 as is illustrated in FIG. 3. The portions 72 and 74 of the housing 71 form the cavity or chamber 82 in which the confinements 12, 14 and 16 are normally disposed in their collapsed condition. Upon the occurrence of an accident and the flow of nitrogen gas into the confinements the expansion of the confinements will cause the housing portions 72 and 74 to move apart along the break line 76 to effectively open the housing and enable the confinements to move into the passenger compartment of the vehicle to protect the occupants of the vehicle as is shown by the phantom line view of the confinements in FIGS. 3 and 4.

Communicating with the diffuser member 24 thereof is the conduit 28 which provides for fluid flow from the diffuser member 24 to the confinement 18 disposed on the steering wheel 19. The steering wheel confinement 18 is disposed on the steering wheel in a well known manner and the conduit 28 communicates at one end thereof with an expansion chamber 110 disposed in the steering column 112. The expansion chamber has located at one end thereof a diffuser plate 114 which has a plurality of openings 116 therein for controlling fluid flow into the confinement 18. The confinement 18 as is illustrated in FIG. 3 normally has a collapsed folded condition within the central hub of the steering wheel 19. A suitable cover 118 is provided over the confinement 18 when in its collapsed condition. When fluid flow from the reservoir 20 is effected the conduit 28 will direct fluid flow from the diffuser member 24 to the pressure chamber 110 in the steering wheel assembly, through the openings 116 in the diffuser plate 114, and into the interior of the collapsed confinement 18. Expansion of the confinement will push the cover assembly 118 out of the way to effect expansion of the confinement 18 in a known manner so as to protect the driver of the vehicle.

Figure 7:
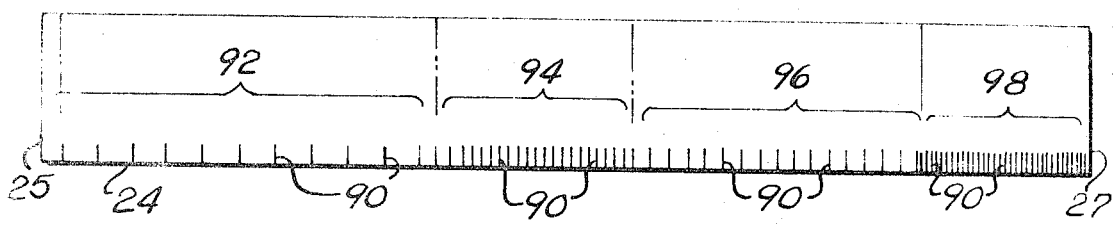
FIG. 7 is a schematic view more fully illustrating one embodiment of the diffuser assembly and the openings disposed therein to provide for controlled inflation of the confinements.

As is schematically illustrated in FIG. 7, the diffuser member 24 includes a plurality of openings 90 therein for communicating with the interior of the confinements 12, 14 and 16 for controlling the fluid flow from the diffuser 24 to the interior of the confinements. The openings are divided into a plurality of groups of openings 92, 94, 96 and 98. Each of the groups of openings have a predetermined location on the diffuser member 24 and a predetermined effective area which provides for a controlled expansion of the confinements 12, 14 and 16.

Figure 5:
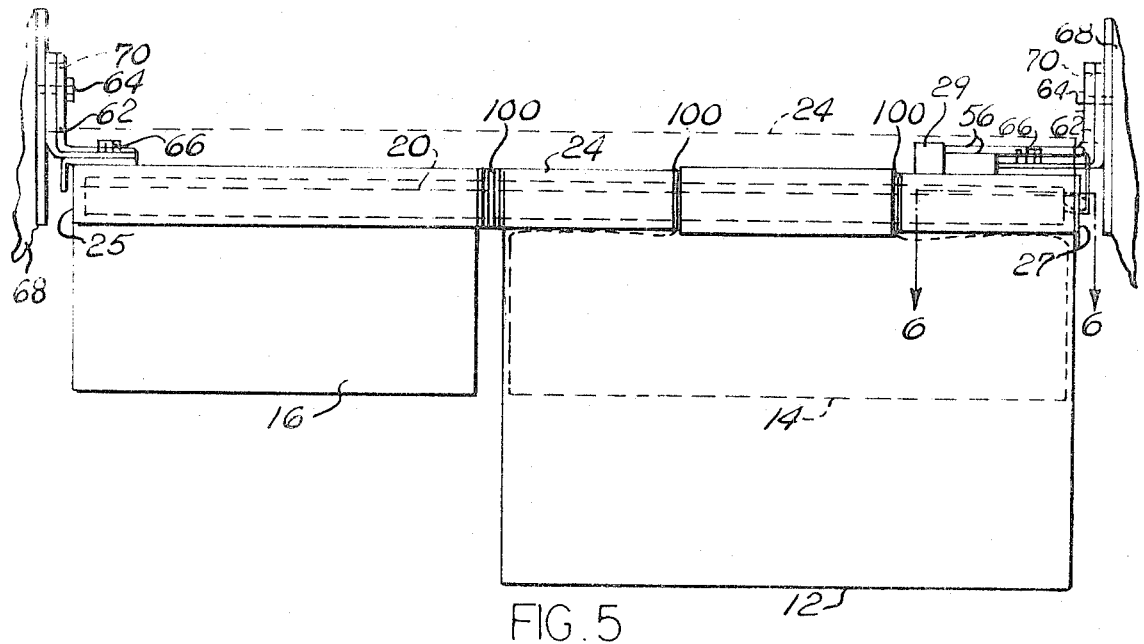
FIG. 5 is a top view of the diffuser assembly more fully illustrating the mounting means and showing the bags in their expanded condition and the diffuser in a position to which it may be moved upon impact therewith by an occupant in phantom lines.

The group of openings 92 includes 11 openings 90 which have a slit-like configuration and which are associated with the knee bag 16 disposed on the driver's side of the vehicle. As is illustrated in FIGS. 5 and 7 the knee bag 16 is clamped to the diffuser member 24 by suitable clamps 100 and communicates only with the openings 90 of the group of openings 92. Thus, the desired expansion rate of confinement 16 may be controlled by controlling the effective area of the openings in the group 92 or by controlling the location of the group of openings 92 as will be more fully discussed hereinbelow.

The group of openings 96 includes 16 slit-like openings 90 which provide for fluid flow to the interior of the knee bag 14. The knee bag 14, associated with the passenger side of the vehicle, is clamped around the diffuser member 24 by the clamps 100 so that the interior of the knee bag 14 communicates only with the opening 90 of the group 96. The groups of openings 94 and 98 are associated with the torso bag 12 disposed on the passenger side of the vehicle. The torso bag 12 is suitably clamped to the diffuser member 24 so that the interior of the torso bag 12 communicates only with the openings 90 of the groups of openings 94 and 98. In the preferred embodiment of the invention the group of openings 94 includes 20 openings 90 having a slit-like configuration and the group of openings 98 includes 32 openings 90 having a slit-like configuration. The number of openings and their effective cross sectional area and location on the diffuser member 24 controls the expansion of the confinement 12 in a predetermined manner as will be more fully described hereinbelow.

FIGS. 8, 9 and 10 sequentially illustrate the expansion of the confinements 12, 14, and 16. When the explosive valve 26 is actuated by the sensor 29, fluid at a high velocity and under high pressure will flow through the openings 44 and 46 in the valve 26 at the end of the fluid reservoir 20 at the end portion 27 of the diffuser member 24. The fluid will then flow from the end portion 27 toward the end plate 25 in the direction of the arrows 100 as shown in FIG. 8 to impinge upon the end plate 25 of the diffuser member 24. The fluid flow from the end portion 27 toward the end plate 25 will be at an extremely high velocity and the major portion of the fluid will flow past the openings 90 in the diffuser member. However, a minor portion of the fluid flow will flow through the openings 90 as is illustrated in FIG. 8. The fluid flow per opening 90 at this point, assuming that all of the openings 90 have an equal cross sectional area, will be directly related to the location of the openings 90 on the diffuser 24. The closer the opening is located to the end portion 27 the greater the fluid flow will be. Accordingly, triangle 101 vectorialy illustrates the flow of the minor portion of the fluid through the openings 90. It should be apparent from FIG. 8 that most of the fluid flow through the openings 90 will occur in the groups of openings 96 and 98.

The major portion of the fluid flow will then impinge upon the end plate 25, as shown in FIG. 9 and build pressure back toward the end portion 27. The pressure buildup or stagnation pressure which develops at the end plate 25 and builds back toward the end portion 27 is a result of the high velocity fluid flow toward the end plate 25. The pressure buildup effects the fluid flow of the major portion of the fluid. It should be realized that the fluid flow toward end plate 25, which is a high velocity fluid flow has a sufficient volume flow rate so as to enable the pressure buildup to progress toward the end portion 27 even though fluid flow is simultaneously occurring through the openings 90 disposed adjacent end plate 25. The fluid flow per opening 90, as the pressure builds up back toward end portion 27 will be dependent on the location of the openings 90 on the diffuser 24. At this point the fluid flow per opening 90 will increase as the distance the opening is disposed relative to the end plate 25 decreases due to the pressure buildup which starts adjacent end plate 25. Accordingly, trapazoid 103 vectorialy illustrates the flow of the major portion of the fluid flow through the openings 90 with the greater fluid flow per opening occurring adjacent the end plate 25.

FIG. 10 illustrates the fluid flow when the diffuser is at relatively equal pressure. At this time the fluid remaining in the diffuser member 24 will exit through the openings 90 to effect expansion of the confinements to the positions illustrated in FIG. 10. The fluid flow per opening at this point, as illustrated in FIG. 10, will be substantially equal through the openings 90. However, since one group of openings have a larger number of openings disposed therein the fluid flow per group of openings will not be equal.

The flow of fluid through the individual openings 90 varies with time and the location of the openings 90 on the diffuser member 24. The reason for the varying flow rate per opening is due to the pressure buildup which moves through the diffuser member. By locating the openings in predetermined locations across the diffuser member and by controlling the cross sectional area of the individual openings or by varying the number of openings in each of the groups of openings 92, 94, 96 and 98 the expansion of the individual confinements 12, 14 and 16 may be controlled so that each individual confinement expands uniformly and so that the knee bags 14 and 16 expand to their fully expanded condition prior to the torso bags reaching their fully expanded condition. Moreover, the knee bags 14 and 16 may be expanded to a higher pressure than the torso bags 12 and 18 by controlling the openings and their position on the diffuser member 24.

It should be apparent that the fluid flow characteristics in the diffuser member 24 are such that fluid will be forced against the end portion 25, and a pressure buildup will occur moving toward the oncoming fluid exiting from the fluid reservoir 20. The inflation of the various confinements 12, 14 and 16 is controlled by locating the openings 90 in the diffuser member in predetermined positions and controlling the effective cross sectional areas of the group or the groups of openings associated with any one of the confinements. This enables the confinements to be expanded in a controlled predetermined manner when one knows the characteristics of the fluid flow through the diffuser member 24.

As illustrated in FIG. 7, the group 92 of openings 90 associated with the knee bag 16 comprises 11 small openings for effecting expansion of the knee bag 16. The group of openings 92 need only have a small effective cross sectional area due to the small volume of the bag 16 and due to the fact that the openings are located adjacent the end plate 25 upon which the fluid impinges when exiting from the diffuser member 20. Thus, at the end plate 25 of the diffuser member, the pressure will tend to be higher than at the opposite end portion 27 when the reservoir has been initially opened. Accordingly, the total volume of fluid flow through the openings 90 adjacent the end plate 25 will be greater than the total volume of fluid flow per openings 90 located adjacent the end portion 27. The group 96 of openings for controlling the fluid flow into the knee bag 14 have a larger cross sectional area due to the fact that there are 16 openings in this group. These openings are located on the diffuser member so that the initial fluid flow will be less per opening 90 than the fluid flow per opening 90 of the group 92. The cross sectional effective area of the group 96 of openings enables the knee bag 14 to be expanded fully prior to the full expansion of the torso bag 12 and enables the knee bag 14 to be expanded to a higher pressure than the torso bag 12.

The groups of openings 94 and 96 associated with the torso bag 12 have respectively 20 and 32 openings 90 disposed therein. Due to the location of the groups of openings on the diffuser member 24 and the number of openings in each of the groups, the fluid flow through the group 92 is equal to the total volume of fluid flow through the group 98 of openings. This equal fluid flow occurs notwithstanding the fact that the number of openings in the group 98 is much greater than the number of openings in the group 94. This is because the average pressure at the end 27 of the diffuser member 24 will be substantially less than the average pressure at the portion of the diffuser member in which the group 94 of openings is disposed. Thus, a substantially equal fluid flow is effected through the group of openings 94 and the group of openings 98 to effect an equal expansion of both sides of the torso bag 12. It should be appreciated that the number of openings 90 associated with expansion of the torso bag 12 is large relative to the number of openings associated with the knee bags 14 and 16 due to the fact that the volume of the torso bag 12 is considerably greater than the volume of either of the knee bag 14 or 16.

While specific locations and numbers of openings has been disclosed for the groups of openings in the diffuser member 24, it should be appreciated that different configurations and different numbers of openings could be utilized depending on the desired type of expansion and the number of confinements associated with the diffuser member 24. For example, if it were desired to effect unequal expansion of the torso bag 12, i.e., where one side would be expanded fully before the other side was fully expanded, the number of openings in the group 94 could be decreased and the number of openings in the group 98 could be increased or vice versa depending on the desired expansion of the torso bag 12.

It should be appreciated that the cross sectional area of the conduit 28 and the point at which conduit 28 communicates with the diffuser member 24 are critical in controlling the expansion rate of the confinement 18 in a desired manner. By locating the end portion 28 of the conduit at different points in communication with the diffuser member 24 different cross sectional areas of the conduit could be utilized much in the same manner that different cross sectional areas of the openings 90 or different numbers of openings 90 in each of the groups on the diffuser member 24 are utilized.

Another modification of the present invention is disclosed in FIG. 11 which discloses the diffuser member 24 mounted in a parallel spaced apart relationship relative to the fluid reservoir 20. The diffuser member 24 is supported by a plurality of deformable supports 120 which are illustrated as telescoping members. The supports 120 support the diffuser member 24 relative to the fluid reservoir 20 and provide for relative movement therebetween in a direction perpendicular to the longitudinal axis of the diffuser member 24 and the fluid reservoir 20. The deformable supports 120 provide for absorbing and dissipating the kinetic energy of the occupant if the occupant impacts with the diffuser member 24 when the confinements are not in their expanded operative conditions. The diffuser member 24 illustrated in FIG. 11 may be rigidly mounted or may be supported by support members 62 which are analogous to the supports 62 illustrated in FIG. 5 and which further provide for absorption and dissipation of the kinetic energy of the occupant of the vehicle if the occupant impacts with the diffuser member 24. As illustrated in FIG. 11 both the diffuser member and the reservoir member are movable to their phantom line positions in the event the occupant should impact with the diffuser member 24. In the event of impact with the diffuser member 24 the diffuser member will effect deformation of the collapsible supports 120 and movement of the reservoir 20 in a direction perpendicular to the longitudinal axis of the reservoir 20 by the supports 62 in a manner analogous to the movement shown in the preferred embodiment of the invention in FIG. 5.

The construction of the diffuser member 24, illustrated in FIG. 11 is substantially analogous to the construction of the diffuser member shown in the previous embodiments of the invention. A conduit 121 provides fluid communication between the reservoir 20 and the end portion 27 of the diffuser member. The location of the slots on the diffuser member 24 illustrated in FIG. 11 will be substantially analogous to the location of the openings 90 shown in FIG. 7. Thus, the fluid flow will enter the diffuser member 24 through the conduit 121 in the manner as described hereinabove.

From the foregoing it should be apparent that a new and improved safety apparatus has been provided which provides protection for an occupant of the vehicle. The safety apparatus includes a plurality of confinements including torso bags and knee bags for locating the occupant of the vehicle in a predetermined position prior to engagement thereof with the torso bags which prevent injury to the occupant during an accident. The safety apparatus further includes a source of fluid and a diffuser member which is mounted with the source of fluid in a position so as to extend across the passenger compartment of the vehicle with the ends adjacent to the side walls of the vehicle. The reservoir and diffuser are movable relative to the passenger compartment to absorb and dissipate the kinetic energy of the occupant in the event the occupant impacts with the safety apparatus. The diffuser member includes a plurality of openings therein which are spaced along the diffuser member in such a manner as to provide for controlled inflation of the confinements. The openings are arranged in a group having different cross sectional areas for effecting expansion of the knee bags more rapidly than expansion of the torso bags and are located at different portions on the diffuser member so as to take advantage of the flow of gas through the diffuser member to effect the expansion of the confinements in a controlled manner.

What we claim is:

1. Safety apparatus for use on a vehicle having a pair of side walls substantially parallel to the normal direction of movement of the vehicle, said apparatus comprising an expandable confinement having a collapsed condition and an expanded operative condition for protecting an occupant of the vehicle during a collision, a source of fluid for effecting expansion of said confinement to said expanded operative condition, a sensor for sensing the occurrence of a collision and actuating said source of fluid to thereby effect expansion of said confinement, an elongate diffuser member providing fluid communication between said source of fluid and said expandable confinement, mounting means for mounting said elongate diffuser member so that the longitudinal axis thereof is disposed perpendicularly to the side walls of the vehicle, said mounting means supporting said elongate diffuser member with the ends thereof adjacent to the side walls of the vehicle, said mounting means comprising a bracket attached to each opposite end portion of said diffuser, said brackets being operable to provide for relative movement between said diffuser and the side walls of the vehicle in a direction parallel to the side walls upon impact of the occupant with the diffuser member to thereby absorb and dissipate a substantial portion of the kinetic energy of the occupant and prevent injury to the occupant.

2. Safety apparatus for use on a vehicle as defined in claim 1 wherein said source of fluid includes a fluid reservoir having a supply of fluid located therein, said fluid reservoir being disposed concentrically with the longitudinal axis of said elongate diffuser member, said diffuser member and said reservoir being movable relative to the side walls of the vehicle upon impact of an occupant with the diffuser member.

3. Safety apparatus for use on a vehicle as defined in claim 2 further including explosive valve means disposed on one end of said fluid reservoir for normally preventing the flow of fluid from said fluid reservoir, said explosive valve means having a shoulder engaging said diffuser member and supporting said fluid reservoir in said concentric relationship relative to said diffuser member, and wherein said diffuser member is disposed around said fluid reservoir.

4. Safety apparatus for use on a vehicle as defined in claim 2 wherein said elongate diffuser member extends substantially completely across the passenger compartment of the vehicle.

5. Safety apparatus for use on a vehicle as defined in claim 6 wherein said expandable confinement includes a torso bag operable to engage with the torso of an occupant of the vehicle, and further including a knee bag for engaging with the legs of an occupant of the vehicle, said knee bag being disposed within said torso bag and said torso bag expanding simultaneously and said knee bag reaching its fully expanded condition prior to said torso bag reaching its fully expanded condition, said knee bag operating to insure that said torso bag expands past the legs of the occupant of the vehicle and to thereby provide room for expansion of said torso bag.

6. Safety apparatus for use on a vehicle as defined in claim 5 wherein said torso bag has a rolled configuration when in said collapsed condition and said knee bag has an accordion packed configuration when in a collapsed condition, said knee bag unfolding to engage the legs of the occupant prior to reaching its fully expanded condition and said torso bag unrolling up the legs of the occupant toward the torso thereof, prior to reaching its fully expanded condition.

7. Safety apparatus for use on a vehicle as defined in claim 5 wherein said diffuser member has a plurality of openings therein which provide for fluid communication between said fluid reservoir and the interior of said torso bag and said knee bag said openings in said diffuser member controlling the expansion of said bags so that the knee bag has a fully expanded condition prior to said torso bag reaching its fully expanded condition.

8. Safety apparatus for use on a vehicle as defined in claim 7 wherein said openings in said diffuser member control the expansion of said bags so that said knee bag has a higher pressure therein, when in said fully expanded condition, than said torso bag, when in said fully expanded condition.

9. Safety apparatus for use on a vehicle as defined in claim 7 wherein said fluid reservoir is operable to be in fluid communication with one end of said diffuser member, the opposite end of said diffuser member having a closed condition, said fluid flow from said fluid reservoir being in a direction from said one end toward said opposite end so as to impinge upon said opposite end and then build pressure back toward said one end during the initial stage of fluid flow and wherein the fluid flow per opening in said diffuser member increases as the distance by which the opening is located from said one end increases.

10. Safety apparatus for use on a vehicle as defined in claim 2 wherein said diffuser member has a thin wall construction of a crushable material which deforms so as to absorb and dissipate kinetic energy of the occupant if the occupant impacts therewith.

11. Safety apparatus for use on a vehicle comprising: first and second expandable confinements each having a collapsed condition and an expanded operative condition for protecting an occupant of the vehicle during the occurrence of a collision, a source of fluid for effecting expansion of said first and second confinements to said expanded operative condition, a sensor for sensing the occurrence of a collision and actuating said source of fluid to thereby effect expansion of said confinements, an elongate diffuser member with said fluid supply disposed therein and having a plurality of openings therein disposed along the length thereof for directing fluid from said source of fluid to said first and second confinements, said diffuser having a first closed end and a second closed end, said plurality of openings including a first group of openings for directing fluid to said first confinement and a second group of openings for directing fluid to said second confinement, said first group of openings being located in a predetermined position along the length of said elongate diffuser and having a combined effective area for effecting expansion of said first confinement in a predetermined manner and said second group of openings being located in a predetermined position along the length of said elongate diffuser and having a combined effective area for effecting expansion of said second confinement in a predetermined manner, mounting means for mounting said elongate diffuser with the longitudinal axis thereof transversely of the vehicle, said mounting means including bracket means attached to each opposite end of said diffuser, said bracket means being operable to provide for relative movement between said diffuser and the side walls of the vehicle in a direction longitudinally of the vehicle upon impact of the occupant with the diffuser member for absorbing and dissipating a desired portion of the kinetic energy of the occupant and preventing injury to the occupant.

12. Safety apparatus for use on a vehicle as defined in claim 11 wherein said first confinement comprises a knee bag for engaging with the legs of a passenger of a vehicle and said second confinement comprises a torso bag for engaging with the torso of a passenger of the vehicle, said torso bag and said knee bag expanding simultaneously from their collapsed condition and said knee bag reaching said expanded operative condition prior to said torso bag reaching said expanded operative condition.

13. Safety apparatus for use on a vehicle as defined in claim 11 further including a third expandable confinement having a collapsed condition and an expanded operative condition, said third confinement comprising a knee bag for engaging with the knees of a driver of the vehicle and said diffuser further including a third group of openings for directing fluid to said third confinement.

14. Safety apparatus for use on a vehicle as defined in claim 13 wherein said diffuser member has a length which is substantially equal to the combined width of said second, and third confinements when in said collapsed conditions.

15. Safety apparatus for use on a vehicle as defined in claim 11 wherein said source of fluid includes a fluid reservoir having high pressure fluid disposed therein, said reservoir being disposed concentrically within said elongate diffuser member and further including explosive valve means disposed at one end of said fluid reservoir providing for opening of said fluid reservoir in response to said sensor sensing the occurrence of a collision, said explosive valve means having a shoulder portion thereon engageable with said diffuser member to thereby hold said fluid reservoir in a predetermined concentric relationship relative to said diffuser member.

16. Safety apparatus for use on a vehicle as defined in claim 11 wherein said openings in said diffuser means controls expansion of said confinements so that said confinements expand equally along the entire width thereof.

17. Safety apparatus for use on a vehicle as defined in claim 16 wherein said diffuser means extends substantially entirely between the side walls of the vehicle with said first and second end portions being disposed adjacent to the side walls of the vehicle.

18. Safety apparatus as defined in claim 11, wherein said first confinement, when in said collapsed condition, has a rolled configuration and is operable to unroll and expand to assume said operative condition upon the application of fluid from said fluid source to the interior of said first confinement.

19. Safety apparatus for use on a vehicle as defined in claim 18 wherein said second expandable confinement expands to its operative condition prior to said first confinement reaching its expanded operative condition, said second confinement providing for positioning of the occupant of the vehicle as said first confinement expands so as to insure a proper clearance space between the occupant and the first confinement as the first confinement reaches its expanded condition.

* * * * *